DIVERSITY GATING SYSTEM
Filed Feb. 27, 1951
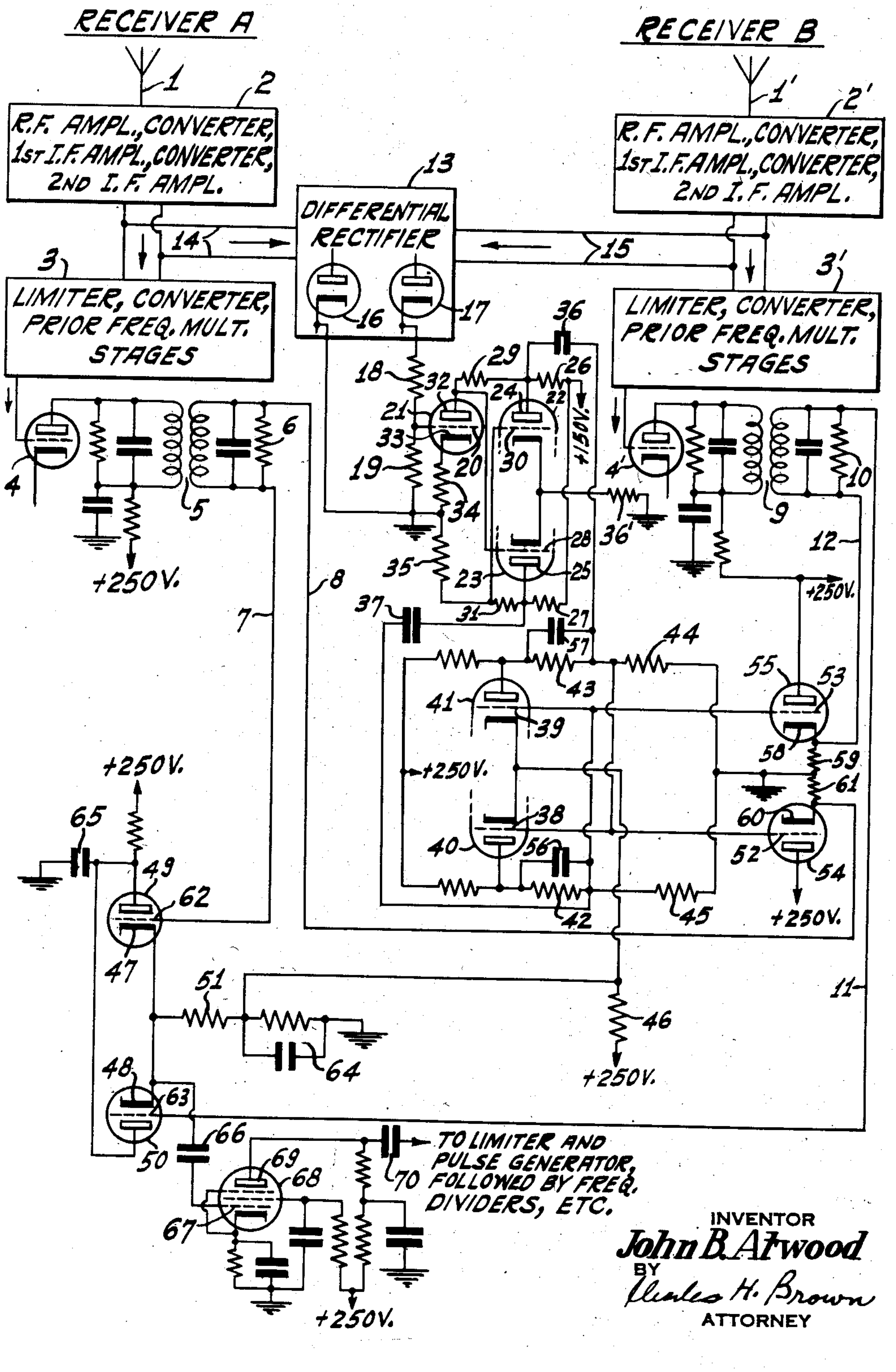
INVENTOR
John B. Atwood
BY
Charles H. Brown
ATTORNEY Patented July 7, 1953

2,644,885

UNITED STATES PATENT OFFICE 2,644,885

DIVERSITY GATING SYSTEM

John B. Atwood, Riverhead, N. Y., assignor to Radio Corporation of America, a corporation of Delaware Application February 27, 1951, Serial No. 212,899

14 Claims. (Cl. 250—20)

This invention relates to a diversity gating system, and more particularly to a gating system which is particularly useful in diversity receivers for frequency modulation (FM) facsimile signals, such as radio frequency carrier shift (RFCS) radiophoto signals.

For illustrative purposes only, the invention will be described herein in connection with a diversity receiver for FM facsimile or RFCS radiophoto signals. Signals of this type are transmitted by shifting the frequency of a radio frequency (RF) carrier, a total shift of some 800 cycles being utilized for the total achromatic tonal range from black to white in the picture. It should be understood, however, that the gating system of the invention is not limited to use in diversity receivers for receiving signals of the above-mentioned type, but may be used in diversity receivers for receiving various other types of signals. For example, it may be used in the diversity reception of frequency shifted telegraph signals, in which the RF carrier is shifted in accordance with signals from a first frequency representing mark to a second frequency representing space, and vice versa.

In my copending application, Serial No. 118,618, filed September 29, 1949, now Patent No. 2,624,834 issued January 6, 1953, there is described a diversity receiving system for radiophoto or facsimile signals, in which the outputs of two receivers connected in diversity are alternatively gated or switched to a common output circuit, the stronger of the two receiver signals being supplied to the common output at all times. In said application, frequency shift transients in the common output, resulting from out-of-phase relation of the two receiver signals when diversity switching takes place, are greatly reduced by multiplying the frequencies of the two receiver signals to be switched to a high frequency prior to the gates and then dividing the frequencies back down following the gates.

I have found that the time required to switch the common output circuit of the receiver from one diversity receiver to another (in other words, the time required for diversity switching) should be short compared to the time of one cycle of the frequency being switched, or phase shifts in excess of 180 degrees can occur. If the switching time were not short compared to the time of one cycle, considerable phase travel would occur during the switching time, in addition to the 180° out-of-phase relation which could exist between the two diversity receiver signals themselves. Phase shifts in excess of 180 degrees would neutralize the benefits obtained by the frequency multiplication and division (that is, the reduction of switching transients and the substantial elimination of dots that could be produced thereby in the received picture). In a system which was actually built and tested, utilizing the principles of the invention disclosed in said copending application, the frequency being switched was centered at 160 kc., for which frequency the time of one cycle is 6.25 microseconds. Therefore, in such a system the time required for diversity switching should be short compared to 6.25 microseconds, for best results.

The gating circuit arrangement utilized in the system of said copending application was disclosed therein as being the same as that described in detail in Schock et al. Patent No. 2,515,668, granted July 18, 1950. It has been found, however, that the gating circuit described in said patent has a switching time of about 40 microseconds, which time is somewhat longer than that desired for optimum results in a radiophoto system as described in said copending application, it being remembered that I have found that the switching time for the particular radiophoto system described as an example should be short compared to 6.25 microseconds, the time of one cycle of the frequency being switched.

An object of this invention is to devise a novel gating circuit which has a switching time substantially shorter than the switching times of previously known circuits.

Another object is to enable the switching of signals which differ from each other by a predetermined amplitude, in a time shorter than the time of one cycle of the signal frequency.

A further object is to devise a novel gating circuit which has a switching time sufficiently short to be used to provide optimum results with the radiophoto diversity receiving system of my said copending application.

The foregoing and other objects of this invention will be best understood from the following description of an exemplification thereof, reference being had to the accompanying drawing, wherein the single figure is a schematic diagram of an arrangement according to this invention.

Referring now to the drawing, receiver A and receiver B are arranged in diversity with respect to a distant transmitting station. In other words, the two respective receiving antennas 1 and 1' are in space or polarization diversity and pick up different versions of the radiophoto or facsimile signal transmitted from the distant transmitting station. Antenna 1 of receiver A feeds its signal into unit 2 while antenna 1' of receiver B feeds its signal into a similar unit 2'. Each of the units 2 and 2' consists of a radio frequency amplifier, a converter (fed also from a heterodyning oscillator common to the two units) which converts the respective amplified radio frequency to a first intermediate frequency such as 450 kc., a first intermediate frequency amplifier, another converter (fed also from a common heterodyning oscillator) which converts the respective signal to a second intermediate frequency such as 50 kc., and a second intermediate frequency amplifier. The respective components in units 2 and 2' may be, and preferably are, arranged as disclosed in my said copending application.

The major portion of the output of unit 2 is fed into a unit 3, while the major portion of the output of unit 2' is fed into a similar unit 3'. Each of units 3 and 3' consists of a limiter, a converter (fed also from a heterodyning oscillator common to the two units) which converts the respective limited signal to another intermediate frequency such as 10 kc., and a plurality of frequency multiplier or harmonic generator stages. Each of these stages consists of a vacuum tube, together with its associated circuit, the respective final tubes being illustrated at 4 and 4' and the output portions of these respective final harmonic generator stages being shown in detail. The arrangement of the respective components in units 3 and 3' may again be as disclosed in my aforementioned copending application.

The anode of tube 4 is coupled to the tuned primary winding of an output transformer 5. A resistor 6 is connected across the tuned secondary winding of transformer 5, and output leads 7 and 8 are connected to respective opposite ends of such secondary winding.

In a similar manner, the anode of tube 4' is coupled to the tuned primary winding of an output transformer 9. A resistor 10 is connected across the tuned secondary winding of transformer 9, and output leads 11 and 12 are connected to respective opposite ends of such secondary winding.

The remaining portion of the output of each of the units 2 and 2' (that is, the portion of each output which is not utilized in its respective unit 3 or 3') is fed to a differential rectifier unit 13 by means of leads 14 and 15, respectively. The differential rectifier 13 may comprise a pair of diode rectifiers 16 and 17 each provided with a separate load resistor (not shown) and each being separately supplied with output from a respective unit 2 or 2'. The two load resistors are connected in series, and together with diodes 16 and 17 constitute a differential rectifier or differential detector system, arranged substantially as shown in Fig. 2 of the aforementioned Schock et al. patent. The differential rectifier produces across the two load resistors potentials which depend on the respective signal strengths in units 2 and 2', since each rectifier 16 and 17 is supplied from a corresponding one of such units and, since the two load resistors are in effect connected differentially with respect to each other, the resultant potential provided by the differential rectifier 13 has a magnitude which indicates which channel (that is, which of the two receivers A or B) has the better signal. A voltage divider network consisting of resistors 18 and 19 is connected in shunt with the load resistor network previously described, the lower end of resistor 19 being grounded.

The junction of resistors 18 and 19 is connected to the control grid 20 of tube 21, which is a trigger driver tube. With the differential rectifier 13 connected as illustrated, the grid 20 of trigger driver 21 is supplied with a direct current control potential which can be either positive or negative with respect to ground, the relative polarity depending on which one of the two receivers has the better (or stronger) signal. Tubes 22 and 23 are included in the first trigger circuit or stage of a double-trigger or two-stage gate control circuit or locking circuit. Tubes 22 and 23 may be included in a common envelope or in separate envelopes. The anode 24 of tube 22 and the anode 25 of tube 23 are connected to the positive terminal of a source of unidirectional voltage by load resistors 26 and 27, respectively. The negative terminal of said source is grounded. The control grid 28 of tube 23 is coupled to the anode 24 by resistor 29 while the control grid 30 of tube 22 is coupled to the anode 25 by resistor 31. The control grid 28 has as its sole biasing resistor, the impedance between the anode 32 of tube 21 and the cathode 33 thereof in series with the resistor 34, between control grid 28 and ground. The control grid 20 has in its grid circuit the resistor 19 previously described, and the control potential applied to grid 20 can be either positive or negative with respect to ground, as previously described. Tube 22 has a grid circuit including biasing resistor 35 connected between the grid 30 and ground and the grid circuits and the anode circuits of tubes 22 and 23 are completed by the common resistor 36' in their cathode return circuits, between the cathodes of these tubes and ground.

The operation of the trigger driver 21 and the first trigger stage 22, 23 will now be explained.

Assume that the tube 23 is cut off and the tube 22 is conducting. Then the voltage on the anode of tube 21 is quite low because this anode voltage is determined in part by the voltage on the anode of tube 22, wherein current is flowing. As a result, very little current flows through tube 21. Therefore, very little bias voltage is developed across resistor 34 and tube 21 is of low anode resistance because its cathode and grid are of substantially like potentials. Since tube 22 is conducting there will be a large drop in voltage across resistor 26 (which is connected to grid 28) and across resistor 36'. Resistor 29 and the low anode resistance of tube 21 act as a voltage divider and the potential across resistor 36' is larger than that from anode 32 to ground. The grid of tube 23 is consequently held negative with respect to its cathode and such tube is cut off. The potential on the grid of tube 23 is then determined by the drop in potential in the anode resistor 26 and the voltage divider action of resistor 29 and tube 21 so the grid of tube 23 is biased to cut off. Since tube 23 is cut off, it draws no current through resistor 27, so the voltage on grid 30 of tube 22 is raised and such tube conducts.

If, now, a potential which is negative with respect to ground is applied to the grid of tube 21, the anode impedance of tube 21 is increased. As a result, the voltage on the anode of tube 21 will increase, since this voltage is determined by a voltage divider action between resistor 29 and the anode resistance of tube 21. Increasing tube 21's resistance therefore changes the voltage divider so as to increase the anode voltage. The increased or less negative voltage appearing on the grid 28 of tube 23 will cause it to conduct and trip the locking circuit in the usual manner.

When tube 23 is conducting, the bias on the grid 30 of tube 22 becomes more negative to bias the tube 22 to cut off. With tube 22 cut off, the voltage on the anode of tube 21 will be higher, thereby causing more current to flow through biasing resistor 34 to make the grid of tube 21 more negative relative to its cathode 33 and increase the anode resistance of tube 21. If the voltage is removed from the input leads, the circuit will remain in its new state.

If, now, a potential which is positive with respect to ground is applied to grid 20 of trigger driver tube 21 (it will be remembered that potentials alternatively positive and negative with respect to ground are supplied by rectifier 13 at the upper end of resistor 19), the trigger circuit 22, 23 is tripped back to its initial condition, with tube 23 cut off and tube 22 conductive. This positive potential on the grid of tube 21 lowers tube 21's anode resistance so that the grid of tube 23 is again held negative with respect to its cathode (due to the changed voltage divider made up of resistor 29 and tube 21's anode resistance) and current is cut off therein, making the anode 25's potential rise or become less negative and causing a corresponding change in potential on the control grid 30 to switch the current through the tube 22 and cut it off in tube 23.

As explained in the aforesaid Schock et al. patent, much more rapid, as well as more positive and dependable, triggering action, as compared to that obtainable with a single trigger circuit, can be obtained if a so-called double or two-stage trigger circuit is used, with the second trigger circuit stage excited by the first trigger circuit stage. It will be recalled that the tubes 22 and 23 constitute the first trigger circuit stage driven by trigger driver tube 21 from the output of differential rectifier 13.

The anodes 24 and 25 of tubes 22 and 23 are coupled by condensers 36 and 37 to the control grids 38 and 39 of tubes 40 and 41 respectively, which are included in the second trigger circuit or second stage of the double trigger gate control circuit by resistors 42 and 43. The grid of tube 40 is connected to ground by resistor 44 while the grid of tube 41 is connected to ground by resistor 45. The cathodes of tubes 40 and 41 are tied together and connected through a resistor 46 to a positive potential point on the power supply. The cathodes 47 and 48 of the gate valves 49 and 50 are also held at this positive potential through a common cathode resistor 51.

Tubes 40 and 41 have their anodes and control grids cross-connected so that they form a trigger circuit as described in connection with tubes 22 and 23. In general, it may be stated that the arrangement is such that tubes 22 and 23 are alternatively conductive because when the anode potential of one thereof drops because of current flow therein, the control grid of the other thereof becomes more negative to cut off current in the other tube. Thus, this arrangement constitutes a trigger or locking circuit having two degrees of electrical stability. Likewise, it may be said that the tubes 22 and 40 are alternatively conductive because when the potential on the anode of tube 22 drops, said drop appears on the control grid of tube 40 through condenser 36, thus decreasing the conductivity of tube 40 to reduce current flow therein. This reduction in tube current makes the anode of tube 40 more positive, and this increase in positive potential operates through the cross-coupling resistance to make the grid of tube 41 more positive so more current flows therein and the tripping action takes place to cut off the current in tube 40. It may also be said that tubes 22 and 41 are tripped in synchronism.

The differentially-varying potentials which constitute the output of the second trigger 40, 41 are taken off from the grids 38 and 39 and applied, by means of direct connections, to the respective grids 52 and 53 of vacuum tubes 54 and 55 connected to act as cathode followers. Since grid 38 is connected to the anode of tube 41 through resistor 43 and since grid 39 is connected to the anode of tube 40 through resistor 42, the differentially-varying potentials may be said to be taken off from resistors 43 and 42, and applied to respective grids 52 and 53.

According to this invention, a capacitor 56 is connected directly in parallel with the anode-to-grid crossover resistor 42 and a capacitor 57 is connected in parallel with the anode-to-grid crossover resistor 43. The addition of these capacitors in parallel with the crossover resistors of the second trigger squares up the wave front of the output from this trigger. With a steeper rise on the wave front, the time required by this trigger to go from one stable state to the other is reduced. In other words, the operation of the second trigger is speeded up by the addition of these capacitors. The time constant of each shunting capacitor and its crossover resistor is made approximately equal to the time constant provided by the grid-to-ground capacitance of the trigger tube grid to which they are connected in parallel with the grid-to-ground resistor of such trigger tube. Thus, the time constant of capacitor 57 and crossover resistor 43 is made approximately equal to the time constant provided by the grid-to-ground capacitance of tube 40 in parallel with grid-to-ground resistor 44. Similarly, the time constant of capacitor 56 and crossover resistor 42 is made approximately equal to the time constant provided by the grid-to-ground capacitance of tube 41 in parallel with grid-to-ground resistor 45.

The anode of tube 55 is connected to a source of positive potential and the cathode 58 of this tube is connected through an output resistor 59 to ground. The anode of tube 54 is connected to a source of positive potential and the cathode 60 of this tube is connected through an output resistor 61 to ground. One secondary terminal of transformer 9 is connected, by means of lead 12, to cathode 58, while one secondary terminal of transformer 5 is connected, by means of lead 8, to cathode 60. One of the two diversity signals to be gated (that from receiver A) goes through transformer 5 and, by means of lead 7, to the grid 62 of gate tube 49. The other diversity signal to be gated (that from receiver B) goes through transformer 9 and, by means of lead 11, to the grid 63 of gate tube 50. The cathodes 47 and 48 of the gate tubes 49 and 50 are connected through the common cathode resistor 51 and a parallel RC network 64 to ground. It will be noted that the grid 62 of tube 49 goes to ground through the secondary winding of transformer 5, lead 8, and resistor 61; therefore, in addition to the signal potential applied to this grid from transformer 5, a biasing potential is applied thereto from resistor 61. Similarly, the grid 63 of tube 50 goes to ground through the secondary winding of transformer 9, lead 12, and resistor 59; therefore, in addition to the signal potential applied to this grid from transformer 9, a biasing potential is applied thereto from resistor 59.

The secondaries of transformers 5 and 9 could be connected directly to the grids of second trigger tubes 40 and 41. However, according to this invention cathode follower tubes 54 and 55 are used instead, to provide a shorter time constant for the switching action than if such direct connections were made. The main reason for a long switching time in a gating circuit of this type is the use of long-time-constant RC circuits. The minimum value of capacitance is fixed by the tube and wiring capacities, including in this case the capacitance to ground presented by the secondaries of transformers 5 and 9 and the capacitance presented by gate tubes 49 and 50; the capacitance to ground of the transformer secondaries is rather high. Since these capacities are more or less fixed, to shorten the switching time it is necessary to reduce the resistance. In other words, the combination of the rather high tube and wiring capacities and the grid-to-ground resistors 44 and 45 (which may each have a value of 68,000 ohms, for example) of the trigger circuit would prevent fast action, or would provide too long a time constant for the switching action.

On the other hand, a cathode follower has an output impedance which is usually less than 1,000 ohms. In other words, the cathode circuit of a cathode follower presents a low impedance, providing a faster time constant for the switching action than if cathode followers 54 and 55 were not utilized and if connections were made from the secondaries of transformers 5 and 9 directly to the grids of trigger tubes 40 and 41. The two cathode followers 54 and 55 are connected to the second trigger grids 38 and 39 to reduce the impedance driving the capacity to ground presented by the secondaries of transformers 5 and 9 and the gate tubes 49 and 50, thus reducing the time constant of the RC circuit and shortening the switching time.

The gate tubes 49 and 50 are preferably sharp cutoff triodes having a common cathode resistor 51. The anodes of the gate tubes are bypassed to ground by a capacitor 65. The output of the gate tubes 49 and 50 is taken from the common cathodes and passes through capacitor 66 to the control grid 67 of the amplifying coupling tube 68. Here, again, for reasons the same as given above for the use of cathode follower tubes 54 and 55, the output is taken from the cathodes of cathode follower gate tubes 49 and 50. The cathode circuits provide a low impedance point, as required for fast switching, utilizing a short time constant RC circuit.

Tube 68 is connected in a more or less conventional amplifying circuit, the output of this tube being obtained at its anode 69 and applied through a coupling condenser 70 to a limiter and pulse generator, followed by frequency dividers, etc., the arrangement here being as disclosed in my aforementioned copending application.

As the potential on the control grid of tube 21 varies in selecting the better signal as determined by the differential rectifier 13 (it will be remembered that the polarity of this potential with respect to ground depends upon receiver, A or B, has the beter signal), the locking circuit tube 22 is tripped one way or the other and a voltage change takes place across resistors 26 and 27 of the tubes 22 and 23, and the pulse so generated varies slowly during a portion of the tripping action and then rapidly at the end of the tripping action. The pulse so generated appears on the condensers 36 and 37 and at the rapid portion thereof instantly trips the trigger or locking tubes 40 and 41 so that the second trigger tubes 40 and 41 reverse each time the first pair of trigger tubes 22 and 23 reverses. The voltages across the resistors 44 and 45 are fed to the grids 52 and 53 of the cathode follower tubes 54 and 55. The voltages appearing at the cathodes 60 and 58 of cathode followers 54 and 55 are positive with respect to ground. The voltages across resistors 61 and 59 of tubes 54 and 55 are fed as biasing potentials to the grids 62 and 63 of the gating tubes 49 and 50. When the second trigger 40, 41 is locked one way (that is, when it is in one stable state) the voltages across the resistors 61 and 59 are such that one gate tube 49 or 50 is biased to cutoff and the other is biased on. The grids of these gate tubes are so biased that anode current flows in one or the other at all times. When the locking circuit or trigger circuit reverses, the voltages across these resistors change differentially so that the gate tube which was cut off is turned on and the gate tube which was turned on is cut off.

In other words, the second trigger 40, 41, via the cathode followers 54 and 55, changes the biases on the gate tube grids 62 and 63 so that one gate tube is conducting and the other cut off. A reversal of the trigger reverses the gate tube biases. There is substantially no change in the direct current level of the common gate tube cathodes 47 and 48 when switching takes place.

In operation of a typical gating circuit according to this invention, the voltages appearing across several points in the circuit were substantially as follows: cathodes of tubes 40 and 41 to ground, 72 volts; cathode of tube 55 to ground, 77 volts or 53 volts; cathode of tube 54 to ground, 53 volts or 77 volts; cathodes of tubes 49 and 50 to ground, 78 volts; grid of tube 50 to its cathode, —1 volt or —25 volts; grid of tube 49 to its cathode, —25 volts or —1 volt. In the foregoing tabulation, the "or" represents the two respective stable states of the second trigger 40, 41.

In operation, signals are amplified, converted and so on in units 2 and 2' and applied to respective units 3 and 3', where they are limited, converted and multiplied in frequency. The outputs of the final frequency multiplier stages 4 and 4' are supplied to the respective gating valves 49 and 50. One of the gating valves 49 or 50 is open depending on the position to which the locking circuit including tubes 22, 23, 40 and 41 has been tripped. The position to which the locking circuit has been tripped depends upon which of the two signals is the better as discerned by the differential rectifier including tubes 16 and 17, the output of which controls the locking or trigger circuit through trigger driver tube 21. One receiver's output is let through by a gating tube and fed to the amplifying coupling tube 68.

The signal passed by the open gating tube is fed to the tube 68 and thence through capacitor 70 to the following units of the diversity receiving system as disclosed in my aforementioned copending application.

In a gating circuit actually constructed according to this invention, it was found that the switching time was approximately 0.2 microsecond, a time which is relatively short as compared to 6.25 microseconds, the time interval which, as previously stated, represents one cycle of the frequency being switched.

In a gating system according to this invention which was built and successfully tested, certain of the components were as listed below. It is to be understood that these values are given merely for purposes of illustration and this invention is not to be at all limited thereby.

| | |
|---|---|
| Tube 21 | 6J5 |
| Tube 22 | ½6SN7-GT |
| Tube 23 | ½6SN7-GT |
| Tube 40 | ½6SN7-GT |
| Tube 41 | ½6SN7-GT |
| Tube 54 | 6J5 |
| Tube 55 | 6J5 |
| Tube 49 | 6SL7-GT |
| Tube 50 | 6SL7-GT |
| Tube 68 | 6AG7 |
| Resistor 26 | 10,000 ohms |
| Resistor 27 | 10,000 ohms |
| Resistor 29 | 150,000 ohms |
| Resistor 31 | 150,000 ohms |
| Resistor 34 | 4,700 ohms |
| Resistor 35 | 100,000 ohms |
| Resistor 42 | 100,000 ohms |
| Resistor 43 | 100,000 ohms |
| Resistor 44 | 68,000 ohms |
| Resistor 45 | 68,000 ohms |
| Resistor 46 | 15,000 ohms |
| Resistor 51 | 6,800 ohms |
| Resistor 59 | 10,000 ohms |
| Resistor 61 | 10,000 ohms |
| Capacitor 36 | 0.001 mfd. |
| Capacitor 37 | 0.001 mfd. |
| Capacitor 56 | 3 mmfd. |
| Capacitor 57 | 3 mmfd. |
| Capacitor 65 | 0.1 mfd. |
| Capacitor 66 | 22 mmfd. |
| Capacitor 70 | 0.001 mfd. |

What I claim to be my invention is as follows:

1. In signalling apparatus, in combination, two signal receivers, means for comparing the relative strengths of the two signals received and for producing a potential the polarity of which is positive or negative with respect to a reference level depending on which received signal is stronger, an electronic valve for each receiver excited by the signal received thereby, a trigger circuit, having two conditions of electrical stability and comprising a pair of intercoupled electrode structures, so arranged that the flow of current in one structure causes a cessation of current in the other structure, and vice versa, means for applying said potential to said trigger circuit to trip the same from one condition to the other, and vice versa, in response to a change in the polarity of said potential, a pair of electrode structures each having an input circuit and each having a cathode follower output circuit, means connecting the input circuit of each of said last-named structures to a separate corresponding one of the two structures of said trigger circuit so that current flow in each of the cathode follower structures is controlled by current flow in its corresponding trigger structure, means coupling the two cathode follower output circuits respectively to corresponding ones of the two valves for making that one thereof conductive which is excited by the stronger signal, and a common output circuit coupled to said two valves.

2. In signalling apparatus, in combination, two signal receivers, means for comparing the relative strengths of the two signals received and for producing a potential the polarity of which is positive or negative with respect to a reference level depending on which received signal is stronger, an electronic valve for each receiver, each of said valves having at least anode, cathode and grid electrodes, means for applying each received signal to a separate corresponding one of said grid electrodes, means coupling the anode electrodes of both of said valves together, a trigger circuit, having two conditions of electrical stability and comprising a pair of intercoupled electrode structures, so arranged that the flow of current in one structure causes a cessation of current in the other structure, and vice versa, means for applying said potential to said trigger circuit to trip the same from one condition to the other, and vice versa, in response to a change in the polarity of said potential, a pair of electrode structures each having an input circuit and each having a cathode follower output circuit, means connecting the input circuit of each of said last-named structures to a separate corresponding one of the structures of said trigger circuit so that current flow in each of the cathode follower structures is controlled by current flow in its corresponding trigger structure, means coupling the two cathode follower output circuits respectively to corresponding ones of the two grid electrodes for making that one of the valves conductive which is excited by the stronger signal, a common cathode impedance coupled to the cathode electrodes of both of said valves, and means for utilizing the voltage developed across said common cathode impedance.

3. In signalling apparatus, in combination, two signal receivers, means for comparing the relative strengths of the two signals received and for producing a potential the polarity of which is positive or negative with respect to a reference level depending on which received signal is stronger, an electronic valve for each receiver excited by the signal received thereby, a trigger circuit, having two conditions of electrical stability and comprising a pair of electrode structures having their anodes and grids cross-coupled through resistors and so arranged that the flow of current in one structure causes a cessation of current in the other structure, and vice versa, a capacitor connected in parallel with each of the two said resistors of said trigger circuit, means for applying said potential to said trigger circuit to trip the same from one condition to the other, and vice versa, in response to a change in the polarity of said potential, means coupling said two structures respectively to corresponding ones of the two valves for making that one thereof conductive which is excited by the stronger signal, and a common output circuit coupled to said two valves.

4. The combination as defined in claim 3, wherein a resistor is connected between the grid of each of the two structures and ground, wherein there is capacitance between the grid of each structure and ground, and wherein the time constant of each parallel combination of capacitor and cross-coupling resistor is approximately equal to the time constant provided by the corresponding grid-to-ground resistor in parallel with its respective grid-to-ground capacitance.

5. In signalling apparatus, in combination, two signal receivers, means for comparing the relative strengths of the two signals received and for producing a potential the polarity of which is positive or negative with respect to a reference level depending on which received signal is stronger, an electronic valve for each receiver excited by the signal received thereby, a trigger circuit, having two conditions of electrical stability and comprising a pair of electrode structures having their anodes and grids cross-coupled through resistors and so arranged that the flow of current in one structure causes a cessation of current in the other structure, and vice versa, a capacitor connected in parallel with each of the two said resistors of said trigger circuit, means for applying said potential to said trigger circuit to trip the same from one condition to the other, and vice versa, in response to a change in the polarity of said potential, a pair of electrode structures each having an input circuit and each having a cathode follower output circuit, means connecting the input circuit of each of said last-named structures to a separate corresponding one of the structures of said trigger circuit so that current flow in each of the cathode follower structures is controlled by current flow in its corresponding trigger structure, means coupling the two cathode follower output circuits respectively to corresponding ones of the two valves for making that one thereof conductive which is excited by the stronger signal, and a common output circuit coupled to said two valves.

6. In signalling apparatus, in combination, two signal receivers, means for comparing the relative strengths of the two signals received and for producing a potential the polarity of which is positive or negative with respect to a reference level depending on which received signal is stronger, an electronic valve for each receiver, each of said valves having at least anode, cathode and grid electrodes, means for applying each received signal to a separate corresponding one of said grid electrodes, means coupling the anode electrodes of both of said valves together, a trigger circuit, having two conditions of electrical stability and comprising a pair of electrode structures having their anodes and grids cross-coupled through resistors and so arranged that the flow of current in one structure causes a cessation of current in the other structure, and vice versa, a capacitor connected in parallel with each of the two said resistors of said trigger circuit, means for applying said potential to said trigger circuit to trip the same from one condition to the other, and vice versa, in response to a change in the polarity of said potential, a pair of electrode structures each having an input circuit and each having a cathode follower output circuit, means connecting the input circuit of each of said last-named structures to a separate corresponding one of the structures of said trigger circuit so that current flow in each of the cathode follower structures is controlled by current flow in its corresponding trigger structure, means coupling the two cathode follower output circuits respectively to corresponding ones of the two grid electrodes for making that one of the valves conductive which is excited by the stronger signal, a common cathode impedance coupled to the cathode electrodes of both of said valves, and means for utilizing the voltage developed across said common cathode impedance.

7. The combination as defined in claim 6, wherein a resistor is connected between the grid of each of the two structures and ground, wherein there is capacitance between the grid of each structure and ground, and wherein the time constant of each parallel combination of capacitor and cross-coupling resistor is approximately equal to the time constant provided by the corresponding grid-to-ground resistor in parallel with its respective grid-to-ground capacitance.

8. In signalling apparatus, in combination, two signal receivers, means for comparing the relative strengths of the two signals received and for producing a potential the polarity of which is positive or negative with respect to a reference level depending on which received signal is stronger, an electronic valve for each receiver excited by the signal received thereby, a double trigger circuit controlled by said potential, said circuit including first and second stages with the second stage excited by the first stage and with the first stage connected to be controlled by said potential, each of said stages comprising a trigger circuit, having two conditions of electrical stability and comprising a pair of intercoupled electrode structures, so arranged that the flow of current in one structure causes a cessation of current in the other structure, and vice versa, a pair of electrode structures each having an input circuit and each having a cathode follower output circuit, means connecting the input circuit of each of said last-named structures to a separate corresponding one of the two second stages structures of said trigger circuit so that current flow in each of the cathode follower structures is controlled by current flow in its corresponding second stage trigger structure, means coupling the two cathode follower output circuits respectively to corresponding ones of the two valves for making that one thereof conductive which is excited by the stronger signal, and a common output circuit coupled to said two valves.

9. In signalling apparatus, in combination, two signal receivers, means for comparing the relative strengths of the two signals received and for producing a potential the polarity of which is positive or negative with respect to a reference level depending on which received signal is stronger, an electronic valve for each receiver, each of said valves having at least anode, cathode and grid electrodes, means for applying each received signal to a separate corresponding one of said grid electrodes, means coupling the anode electrodes of both of said valves together, a double trigger circuit controlled by said potential, said circuit including first and second stages with the second stage excited by the first stage and with the first stage connected to be controlled by said potential, each of said stages comprising a trigger circuit, having two conditions of electrical stability and comprising a pair of intercoupled electrode structures, so arranged that the flow of current in one structure causes a cessation of current in the other structure, and vice versa, a pair of electrode structures each having an input circuit and each having a cathode follower output circuit, means connecting the input circuit of each of said last-named structures to a separate corresponding one of the two second stage structures of said trigger circuit so that current flow in each of the cathode follower structures is controlled by current flow in its corresponding second stage trigger structure, means coupling the two cathode follower output circuits respectively to corresponding ones of the two grid electrodes for making that one of the valves conductive which is excited by the stronger signal, a common cathode impedance coupled to the cathode electrodes of both of said valves, and means for utilizing the voltage developed across said common cathode impedance.

10. In signalling apparatus, in combination, two signal receivers, means for comparing the relative strengths of the two signals received and for producing a potential the polarity of which is positive or negative with respect to a reference level depending on which received signal is stronger, an electronic valve for each receiver excited by the signal received thereby, a double trigger circuit controlled by said potential, said circuit including first and second stages with the second stage excited by the first stage and with the first stage connected to be controlled by said potential, each of said stages comprising a trigger circuit, having two conditions of electrical stability and comprising a pair of electrode structures having their anodes and grids cross-coupled through resistors and so arranged that the flow of current in one structure causes a cessation of current in the other structure, and vice versa, a capacitor connected in parellel with each of the two said resistors of the two second stage structures of said trigger circuit, means coupling the two second stage trigger structures respectively to corresponding ones of the two valves for making that one thereof conductive which is excited by the stronger signal, and a common output circuit coupled to said two valves.

11. The combination as defined in claim 10, wherein a resistor is connected between the grid of each of the two second stage trigger structures and ground, wherein there is capacitance between the grid of each such structure and ground, and wherein the time constant of each parallel combination of capacitor and cross-coupling resistor is approximately equal to the time constant provided by the corresponding grid-to-ground resistor in parallel with its respective grid-to-ground capacitance.

12. In signalling apparatus, in combination, two signal receivers, means for comparing the relative strengths of the two signals received and for producing a potential the polarity of which is positive or negative with respect to a reference level depending on which received signal is stronger, an electronic valve for each receiver excited by the signal received thereby, a double trigger circuit controlled by said potential, said circuit including first and second stages with the second stage excited by the first stage and with the first stage connected to be controlled by said potential, each of said stages comprising a trigger circuit, having two conditions of electrical stability and comprising a pair of electrode structures having their anodes and grids cross-coupled through resistors and so arranged that the flow of current in one structure causes a cessation of current in the other structure, and vice versa, a capacitor connected in parallel with each of the two said resistors of the two second stage structures of said trigger circuit, a pair of electrode structures each having an input circuit and each having a cathode follower output circuit, means connecting the input circuit of each of said last-named structures to a separate corresponding one of the two second stage structures of said trigger circuit so that current flow in each of the cathode follower structures is controlled by current flow in its corresponding second stage trigger structure, means coupling the two cathode follower output circuits respectively to corresponding ones of the two valves for making that one thereof conducting which is excited by the stronger signal, and a common output circuit coupled to said two valves.

13. In signalling apparatus, in combination, two signal receivers, means for comparing the relative strengths of the two signals received and for producing a potential the polarity of which is positive or negative with respect to a reference level depending on which received signal is stronger, an electronic valve for each receiver, each of said valves having at least anode, cathode and grid electrodes, means for applying each received signal to a separate corresponding one of said grid electrodes, means coupling the anode electrodes of both of said valves together, a double trigger circuit controlled by said potential, said circuit including first and second stages with the second stage excited by the first stage and with the first stage connected to be controlled by said potential, each of said stages comprising a trigger circuit, having two conditions of electrical stability and comprising a pair of electrode structures having their anodes and grids cross-coupled through resistors and so arranged that the flow of current in one structure causes a cessation of current in the other structure, and vice versa, a capacitor connected in parallel with each of the two said resistors of the two second stage structures of said trigger circuit, a pair of electrode structures each having an input circuit and each having a cathode follower output circuit, means connecting the input circuit of each of said last-named structures to a separate corresponding one of the two second stage structures of said trigger circuit so that current flow in each of the cathode follower structures is controlled by current flow in its corresponding second stage trigger structure, means coupling the two cathode follower output circuits respectively to corresponding ones of the two grid electrodes for making that one of the valves conductive which is excited by the stronger signal, a common cathode impedance coupled to the cathode electrodes of both of said valves, and means for utilizing the voltage developed across said common cathode impedance.

14. The combination as defined in claim 13, wherein a resistor is connected between the grid of each of the two second stage trigger structures and ground, wherein there is capacitance between the grid of each such structure and ground, and wherein the time constant of each parallel combination of capacitor and cross-coupling resistor is approximately equal to the time constant provided by the corresponding grid-to-ground resistor in parallel with its respective grid-to-ground capacitance.

JOHN B. ATWOOD.

References Cited in the file of this patent

UNITED STATES PATENTS

| Number | Name | Date |
|---|---|---|
| 2,494,309 | Peterson | Jan. 10, 1950 |
| 2,495,826 | Schock | Jan. 31, 1950 |
| 2,515,055 | Peterson | July 11, 1950 |
| 2,515,668 | Schock | July 18, 1950 |
| 2,545,214 | Schock | Mar. 13, 1951 |
| 2,572,912 | Bucher | Oct. 30, 1951 |
| 2,614,215 | Karp et al. | Oct. 14, 1952 |